United States Patent
Yamagishi (10) Patent No.: US 11,947,929 B2
(45) Date of Patent: Apr. 2, 2024

(54) PRODUCT-SUM ARITHMETIC DEVICE, PRODUCT-SUM ARITHMETIC CIRCUIT, AND PRODUCT-SUM ARITHMETIC METHOD

(71) Applicant: SONY CORPORATION, Tokyo (JP)

(72) Inventor: Hiroyuki Yamagishi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 631 days.

(21) Appl. No.: 17/250,299

(22) PCT Filed: Jul. 4, 2019

(86) PCT No.: PCT/JP2019/026716
§ 371 (c)(1),
(2) Date: Dec. 29, 2020

(87) PCT Pub. No.: WO2020/009201
PCT Pub. Date: Jan. 9, 2020

(65) Prior Publication Data
US 2021/0271452 A1 Sep. 2, 2021

(30) Foreign Application Priority Data
Jul. 6, 2018 (JP) .................................. 2018-129329

(51) Int. Cl.
*G06F 7/544* (2006.01)
*G06N 3/04* (2023.01)

(52) U.S. Cl.
CPC .............. *G06F 7/5443* (2013.01); *G06N 3/04* (2013.01)

(58) Field of Classification Search
CPC ........... G06F 7/5443; G06F 2007/4814; G06F 2007/4824; G06F 7/10
USPC ........................................................ 708/603
See application file for complete search history.

(56) References Cited

U.S. PATENT DOCUMENTS

| | | | |
|---|---|---|---|
| 2005/0138100 A1 | 6/2005 | Nomura et al. | |
| 2017/0004398 A1 | 1/2017 | Chen et al. | |
| 2019/0171418 A1 | 6/2019 | Morie et al. | |

FOREIGN PATENT DOCUMENTS

| | | |
|---|---|---|
| CN | 1998012 A | 7/2007 |
| EP | 1676225 A2 | 7/2006 |
| EP | 3502950 A1 | 6/2019 |
| JP | 07-141313 A | 6/1995 |
| JP | 2005-122465 A | 5/2005 |
| JP | 2017-016302 A | 1/2017 |
| KR | 10-2019-0039506 A | 4/2019 |
| TW | 201810018 A | 3/2018 |
| WO | 2005/038704 A1 | 4/2005 |
| WO | 2018/034163 A1 | 2/2018 |

OTHER PUBLICATIONS

Machine Translation JP 7-141313 A, Jun. 2, 1995.*
International Search Report and Written Opinion of PCT Application No. PCT/JP2019/026716, dated Sep. 10, 2019, 08 pages of ISRWO.

* cited by examiner

*Primary Examiner* — Tan V Mai
(74) *Attorney, Agent, or Firm* — CHIP LAW GROUP (57) ABSTRACT

An arithmetic device includes a comparison unit comparing voltage generated with charge stored in a storage unit with a threshold, and outputting an output signal at a timing when the voltage exceeds the threshold, and a timing extension unit extending an interval between timings at each of which the output signal is output.

10 Claims, 8 Drawing Sheets

PRODUCT-SUM ARITHMETIC DEVICE, PRODUCT-SUM ARITHMETIC CIRCUIT, AND PRODUCT-SUM ARITHMETIC METHOD

CROSS REFERENCE TO RELATED APPLICATIONS

This application is a U.S. National Phase of International Patent Application No. PCT/JP2019/026716 filed on Jul. 4, 2019, which claims priority benefit of Japanese Patent Application No. JP 2018-129329 filed in the Japan Patent Office on Jul. 6, 2018. Each of the above-referenced applications is hereby incorporated herein by reference in its entirety.

FIELD

The present disclosure relates to a product-sum arithmetic device, a product-sum arithmetic circuit, and a product-sum arithmetic method.

BACKGROUND

In recent years, various circuits performing arithmetic operations simulating a neural network have been proposed.

For example, Patent Literature 1 discloses a technique of executing an arithmetic operation in a time-base analog product-sum arithmetic circuit including a RC circuit and a comparator, on the basis of timing of outputting a signal from the comparator.

CITATION LIST

Patent Literature

Patent Literature 1: PCT International Publication No. 2018/034163

SUMMARY

Technical Problem

In the conventional art described above, however, timings of outputting a signal are sometimes concentrated with some parameters. In this case, it may become difficult to distinguish the timings of outputting a signal from the comparator from each other.

For this reason, the present disclosure proposes a product-sum arithmetic device, a product-sum arithmetic circuit, and a product-sum arithmetic method capable of distributing timings of outputting a signal.

Solution to Problem

To solve the problem described above, a product-sum arithmetic device includes: a comparison unit comparing voltage generated with charge stored in a storage unit with a threshold, and outputting an output signal at a timing when the voltage exceeds the threshold; and a timing extension unit extending an interval between timings at each of which the output signal is output.

Advantageous Effects of Invention

The present disclosure enables distribution of timings of outputting a signal. The effects described herein are not necessarily limited, but may be any of the effects disclosed in the present disclosure.

DESCRIPTION OF EMBODIMENTS

Embodiments of the present disclosure will now be described hereinafter in detail with reference to drawings. In the following embodiments, the same elements are denoted by the same respective reference numerals, and an overlapping explanation thereof is omitted.

The present disclosure will be described hereinafter in accordance with the order of items described as follows.
1. Outline
  1-1. Outline of product-sum arithmetic device
  1-2. Outline of product-sum operator
2. First Embodiment
  2-1. Structure of product-sum operator of product-sum arithmetic device according to first embodiment
  2-2. Example of operations of product-sum operator of a product-sum arithmetic device according to first embodiment
  2-3. Modification of first embodiment
3. Second Embodiment
  3-1. Structure of product-sum operator of product-sum arithmetic device according to second embodiment
4. Third Embodiment
  4-1. Structure of product-sum operator of product-sum arithmetic device according to third embodiment

1. Outline

1-1. Outline of Product-Sum Arithmetic Device

First, the following is an explanation of an outline of a product-sum arithmetic device 10 to which each of embodiments of the present disclosure is applied. Each of product-sum operators 11 of the product-sum arithmetic device 10 according to each of the embodiments of the present disclosure associates each of N electrical signal $I_i$ with a weight (weight) $w_i$, and derives the sum of N multiplication values each obtained by multiplying the electrical signal $I_i$ by the weight $w_i$ forming a pair. N is a natural number of 2 or more, and i is a natural number of N or less.

Suppose that the value indicated with the electrical signal $I_i$ (hereinafter also simply referred to as "electrical signal") is $x_i$, and N electrical signals are supplied to a product-sum operator 1 within a certain period $T_1$. In this case, the sum of N multiplication values obtained with the product-sum operator 11 is indicated as in the following expression (1).

$$\sum_{i=1}^{N} w_i \cdot x_i \tag{1}$$

Figure 1:
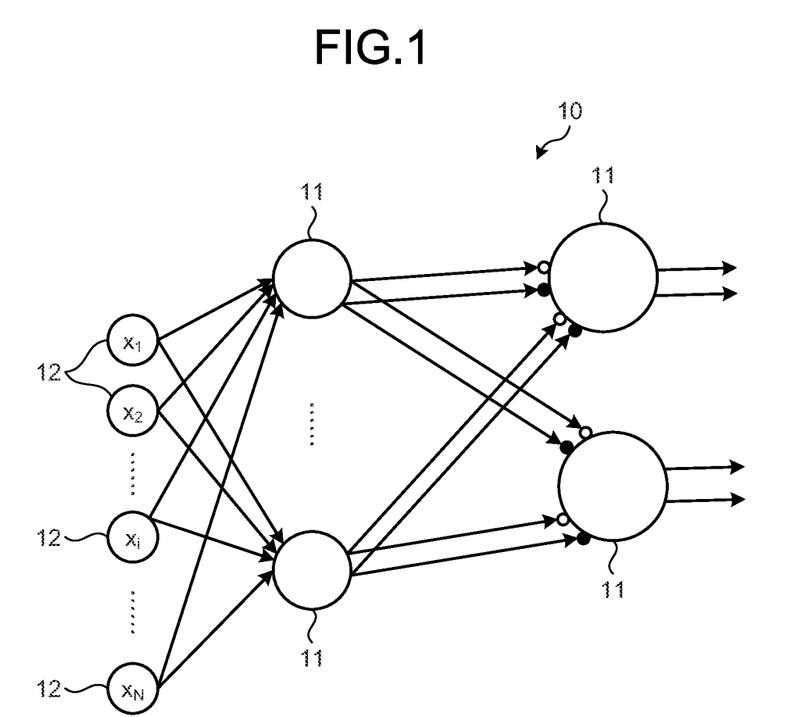
FIG. 1 is a schematic diagram illustrating a product-sum arithmetic device.

As illustrated in FIG. 1, the product-sum arithmetic device 10 has a structure in which a plurality of product-sum operators 11 are provided in each of a plurality of layers. Each of the product-sum operators 11 of the lowest layer calculates calculation target values on the basis of values $x_i$ indicated with N electrical signals (for example, pulse signals) provided from a plurality of input units 12 and weights $w_i$ applied to the respective electrical signals. Each of the product-sum operators 11 transmits electrical signals indicating the calculation target values to product-sum operators 11 of the upper layer.

Each of the product-sum operators 11 of the upper layer associates weights $w_i$ with the respective values of the electrical signals transmitted from the product-sum operators 11 of the lower layer, and determines calculation target values. Thereafter, each of the product-sum operators 11 of the upper layer transmits the electrical signals indicating the calculation target values to product-sum operators 11 of the further upper layer. The product-sum arithmetic device 10 according to each of the embodiments of the present disclosure is designed to be applicable to a neural network. The product-sum arithmetic device 10 as described above executes, a plurality of times, processing of determining calculation target values in each of the product-sum operators 11 of the upper layer on the basis of the calculation target values determined in the product-sum operators 11 of the lower layer. In this manner, the product-sum arithmetic device 10 executes image recognition processing and the like.

1-2. Outline of Product-Sum Operator

A structure and processing of a product-sum operator 11a serving as an outline of the product-sum operator 11 will be explained with reference to FIG. 2. In this explanation, suppose that the electrical signal $x_i$ is a variable of 0 to 1. The weights $w_i$ include a positive weight $w_i^+$ being a positive value and a negative weight $w_i^+$ being a negative value, but it is explained on the supposition that they are not distinguished from each other.

Figure 2:
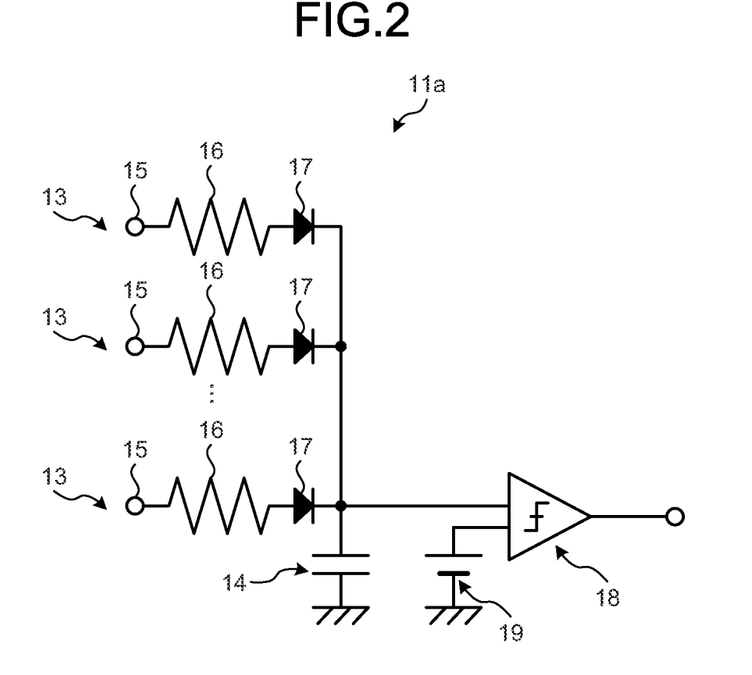
FIG. 2 is a schematic diagram of a product-sum operator of the product-sum arithmetic device.

As illustrated in FIG. 2, the product-sum operator 11a includes N output units 13, a storage unit 14, a comparison unit 18, and a threshold power source 19.

The output units 13 are connected in parallel. Each of the output units 13 associates an electrical signal provided within a certain period $T_1$ with a weight $w_i$, and outputs a charge of a magnitude corresponding to the value of the weight $w_i$. In addition, as illustrated in FIG. 2, each of the output units 13 includes an input terminal 15, a resistor 16, and a diode 17. The input terminal 15, the resistor 16, and the diode 17 are connected in series. In the output units 13, the respective input terminals 15 are provided with respective electrical signals having varying values at different timings in the period $T_1$.

The storage unit 14 is connected with each of the output units 13, and stores therein charges output from the respective output units 13. The storage unit 14 is, for example, a capacitor.

Suppose that the length of the period $T_1$ is $T_{in}$, and the timing at which the electrical signal is provided to the input terminal 15 of the output unit 13 is $t_i$. In this case, in the product-sum operator 11a, the value $x_i$ indicated with the electrical signal provided to the input terminal 15 can be converted into timing $t_i$ at which the electrical signal is provided, by using the following expression (2).

$$t_i = T_{in}(1-x_i) \tag{2}$$

Supposing that the waveform generated at the timing $t_i$ at which the electrical signal is provided and increasing or decreasing in proportion to a lapse of time t is a response waveform W, the charge quantity $P_i(t)$ supplied from each of the output units 13 to the storage unit 14 can be indicated with a magnitude of the response waveform W. Supposing that $k_i$ is inclination of the response waveform W with respect to a lapse of the time t, the weight $w_i$ can be converted into $k_i$ using the following expression (3).

$$k_i = \lambda w_i \tag{3}$$

When the waveform obtained by summing up all the response waveforms W is a synthetic waveform TW, the magnitude of the synthetic waveform TW is a sum total of $P_1(t), P_2(t), P_3(t), \ldots, P_N(t)$. This is equal to the voltage generated with the storage unit 14. Suppose that the voltage retained in the storage unit 14 is $V_N(t)$.

The comparison unit 18 compares a threshold with the input signal, and outputs a step waveform when the input signal exceeds the threshold. The comparison unit 18 is, for example, a comparator. The comparison unit 18 is connected with the storage unit 14 and the threshold power source 19.

The threshold power source 19 provides a threshold voltage to the comparison unit 18. Suppose that the magnitude of the threshold voltage is $\theta$. In this case, the comparison unit 18 outputs a step waveform at a timing at which the voltage $V_N(t)$ retained in the storage unit 14 exceeds the threshold $\theta$. Supposing that the timing at which the $V_N(t)$ reaches the threshold $\theta$ is $t_v$, the following expression (4) is obtained.

$$\sum_{i=1}^{N} k_i(t_v - t_i) = \theta \tag{4}$$

In addition, supposing that the sum total of the weights $w_i$ is $\beta$, $\beta$ can be indicated with the following expression (5).

$$\beta = \sum_{i=1}^{N} w_i \tag{5}$$

On the basis of the expression (2) to the expression (4), the calculation target values of the product-sum operator 11a can be indicated with the following expression (6).

$$\sum_{i=1}^{N} w_i \cdot x_i = \frac{\theta/\lambda + \beta(T_{in} - t_v)}{T_{in}} \quad (6)$$

Suppose that all the weights $w_i$ are positive values. In this case, when the value $x_i$ indicated with the electrical signal provided to each of the input terminals 15 has a minimum value of 0, the left side of the expression (6) is 0, and the timing of $t_v$ becomes latest. The timing $t_v^{min}$ can be indicated with the following expression (7).

$$t_v^{min} = \frac{\theta}{\lambda\beta} + T_{in} \quad (7)$$

The fact that the left side of the expression (6) has a value of 0 means that the timing at which the step waveform is output from the comparison unit 18 is latest.

By contrast, when the value $x_i$ indicated with the electrical signal provided to each of the input terminals 15 has a maximum value of 1, the right side of the expression (6) is $\beta$, and the timing of $t_v$ becomes earliest. The timing $t_v^{max}$ is indicated with the following expression (8).

$$t_v^{max} = \frac{\theta}{\lambda\beta} \quad (8)$$

The fact that the right side of the expression (6) has a value of 1 means that the timing at which the step waveform is output from the comparison unit 18 is earliest. For this reason, on the basis of the expression (7) and the expression (8), the period $T_2$ for which the step waveform is output from the comparison unit 18 is $[t_v^{max}, t_v^{min}]$, and the time length $T_v$ of the period $T_2$ can be provided with the following expression (9).

$$T_v = t_v^{min} - t_v^{max} = T_{in} \quad (9)$$

Accordingly, the time length $T_v$ of the period $T_2$ for which the step waveform is output from the comparison unit 18 is equal to the time length $T_{in}$ of the period $T_1$ for which the electrical signal is provided to each of the output units 13.

The product-sum arithmetic device 10 is capable of determining a result of a product-sum arithmetic operation using the timing at which a step waveform is output. With some parameters of the electrical signal provided to the input terminal 15, however, the timings at each of which a step waveform is output may be concentrated.

Figure 3:
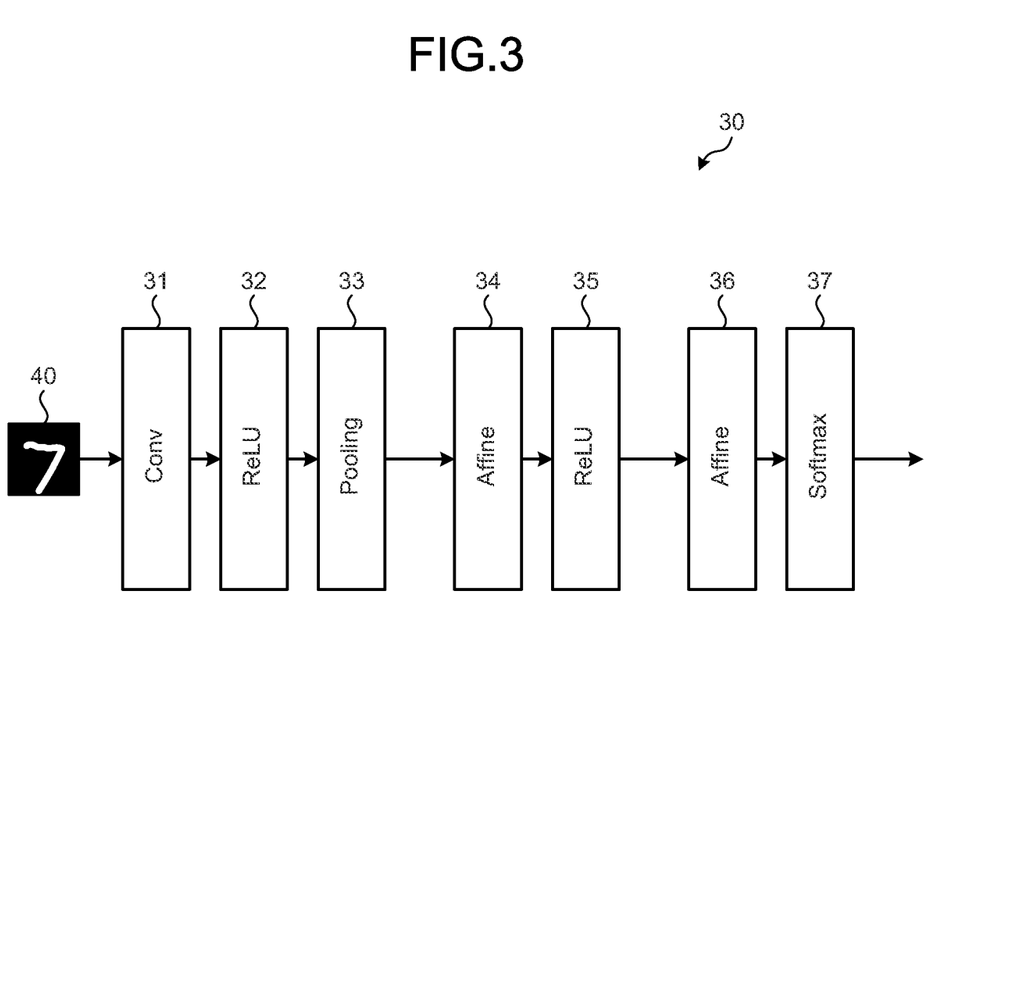
FIG. 3 is a diagram illustrating an example of a structure of a neural network.

An example of the case where timings at each of which a step waveform is output are concentrated will be explained with reference to FIG. 3. FIG. 3 is a diagram illustrating an example of a structure of deep neural networks (DNN) of the product-sum arithmetic device 10.

As illustrated in FIG. 3, a DNN 30 includes a Convolution layer 31, a first ReLU layer 32, a Pooling layer 33, a first Affine layer 34, a second ReLU layer 35, a second Affine layer 36, and a Softmax layer 37. In the DNN 30 as described above, processing of performing recognition of a character 40 of MNIST will be considered.

Figure 4:
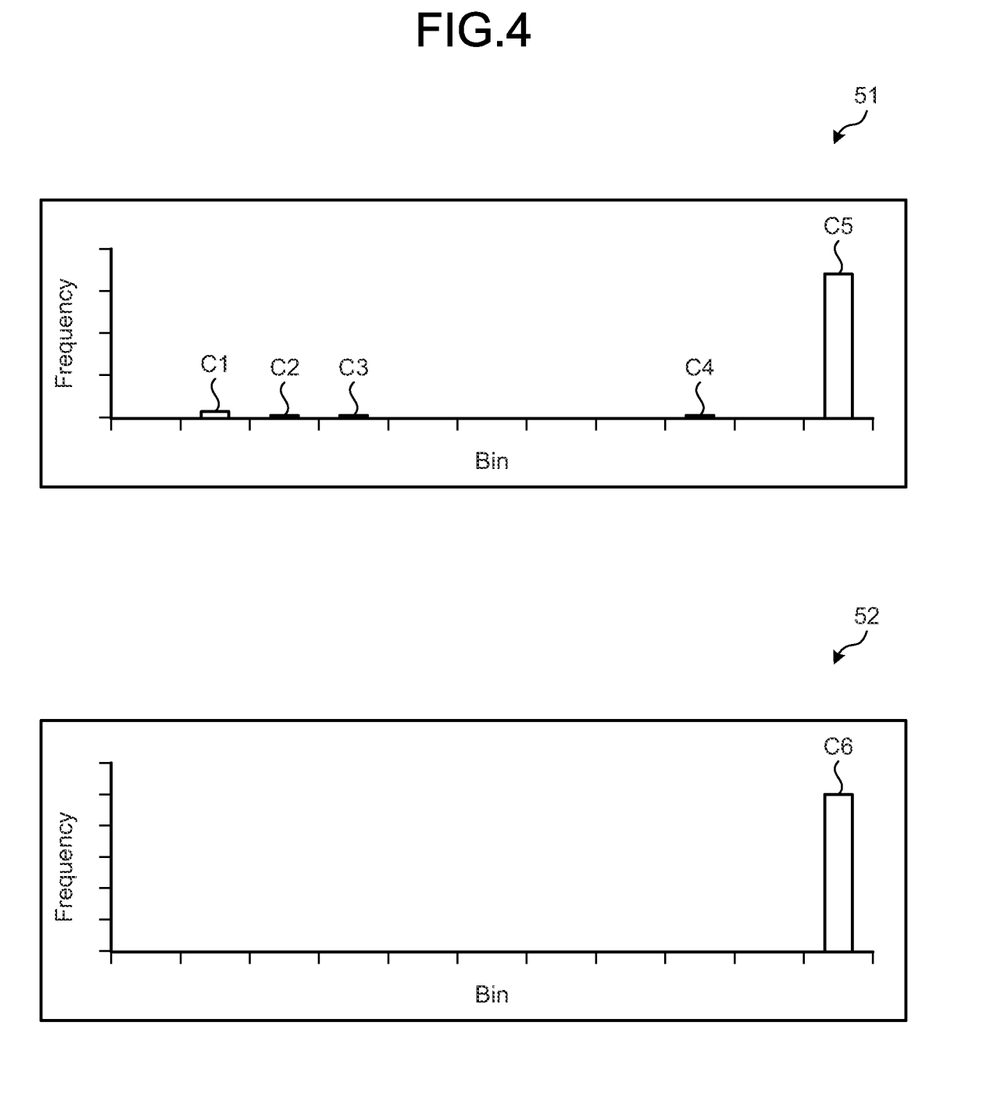
FIG. 4 is a diagram for explaining an output timing of the product-sum operator.

A histogram 51 illustrated in FIG. 4 is a histogram indicating time distribution of timings at each of which an image is converted in accordance with the expression (2) and input to the Convolution layer 31. As illustrated in the histogram 51, the output timings of the comparison unit 18 in the layer are distributed to the points C1, C2, C3, C4, and C5 in time. The standard deviation a of the timings indicated with the histogram 51 is, for example, 0.26 ρs.

A histogram 52 illustrated in FIG. 4 is a histogram indicating output timings of the comparison unit 18 of the second Affince layer 36. As illustrated in the histogram 52, the output timings of the comparison unit 18 in the layer are concentrated on the point C6 in time. The standard deviation a of the timings indicated with the histogram 52 is, for example, 0.000044 ρs.

As illustrated in FIG. 4, in the DNN 30, as arithmetic operations of the layers advance, the output timings of the comparison unit 18 are concentrated. In such a case, high performance is required for time resolution of the circuit discriminating the timings at each of which a step waveform is output from the comparison unit 18. For this reason, there is the possibility that the timing at which the step waveform is output from the comparison unit 18 cannot be discriminated.

For this reason, the product-sum arithmetic device according to the present disclosure executes processing of extending the interval between timings at each of which a step waveform is output. With this structure, the product-sum arithmetic device according to the present disclosure enables delay of the time at which the subsequent step waveform is output after a step waveform is output, and prevents concentration of timings at each of which a step waveform is output.

2. First Embodiment

Figure 5:
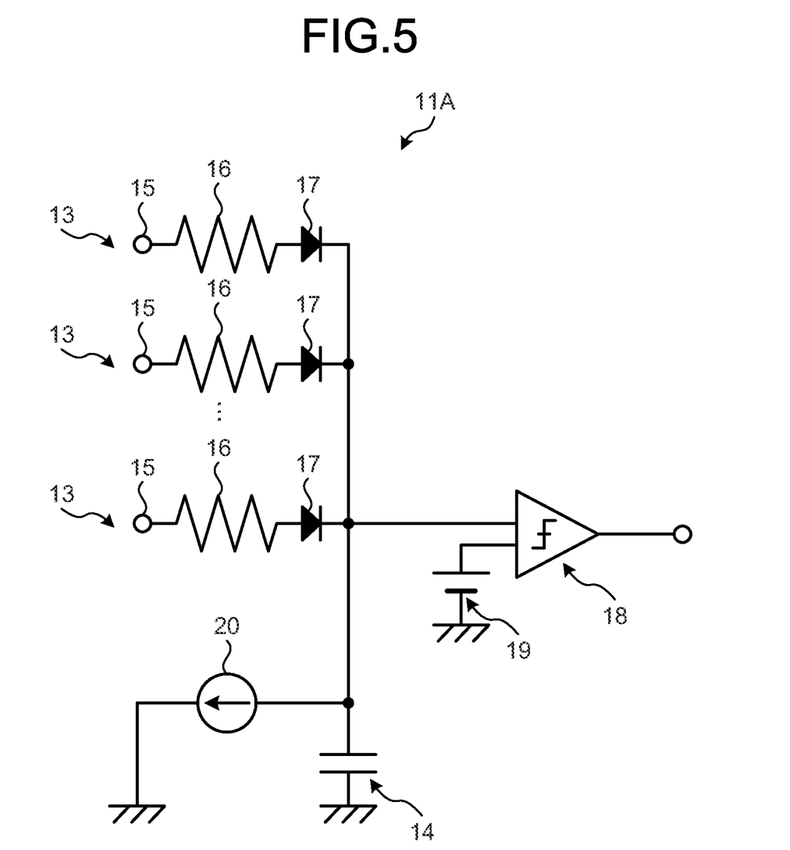
FIG. 5 is a diagram illustrating an example of a product-sum operator included in a product-sum arithmetic device according to a first embodiment of the present disclosure.

2-1. Structure of Product-Sum Operator of Product-Sum Arithmetic Device According to First Embodiment The structure of the product-sum arithmetic device according to the first embodiment of the present disclosure will be explained hereinafter with reference to FIG. 5. FIG. 5 is a diagram illustrating the structure of a product-sum operator included in the product-sum arithmetic device according to the first embodiment of the present disclosure.

As illustrated in FIG. 5, a product-sum operator 11A includes N output units 13, a storage unit 14, a comparison unit 18, a threshold power source 19, and a current source 20. The product-sum operator 11A is different from the product-sum operator 11a in that the product-sum operator 11A includes the current source 20.

The current source 20 is connected with the storage unit 14 and a ground. In this case, when the switch of the current source 20 is turned on and a current flows, the charge stored in the storage unit 14 is discharged to the ground. This structure delays the time required until the voltage retained in the storage unit 14 reaches the threshold. Consequently, this structure extends the time interval between the time when a step waveform is output from the comparison unit 18 and the time when a step waveform is output from the comparison unit 18 next. Specifically, the current source 20 functions as a timing extension unit extending the interval between the timings at each of which a step waveform is output from the comparison unit 18. The switch of the current source 20 is turned on and off with, for example, a control unit included inside. Such a control unit can be achieved with, for example, an electronic circuit including a central processing unit (CPU).

The current source 20 may receive, for example, information relating to temporal change of the charge stored in the storage unit 14. In this case, the current source 20 may acquire information relating to temporal change of the charge stored in the storage unit 14 and measured with a charge quantity measuring device, such as a Coulomb meter and a charge amplifier, from the charge quantity measuring device. This structure enables the current source 20 to control the quantity of the charge discharged from the storage unit 14 in accordance with temporal change of the charge stored in the storage unit 14. Consequently, this structure more properly extends the time interval between the time when a step waveform is output from the comparison unit 18 and the time when the subsequent step waveform is output from the comparison unit 18.

The product-sum operator 11A illustrated in FIG. 5 includes only one comparison unit 18, but the structure is an example and does not limit the present disclosure. The product-sum operator 11A may have a structure of including a plurality of comparison units 18 and outputting a plurality of signals. In this case, for example, the threshold power source 19 connected with the comparison units 18 may have a common structure.

Figure 6:
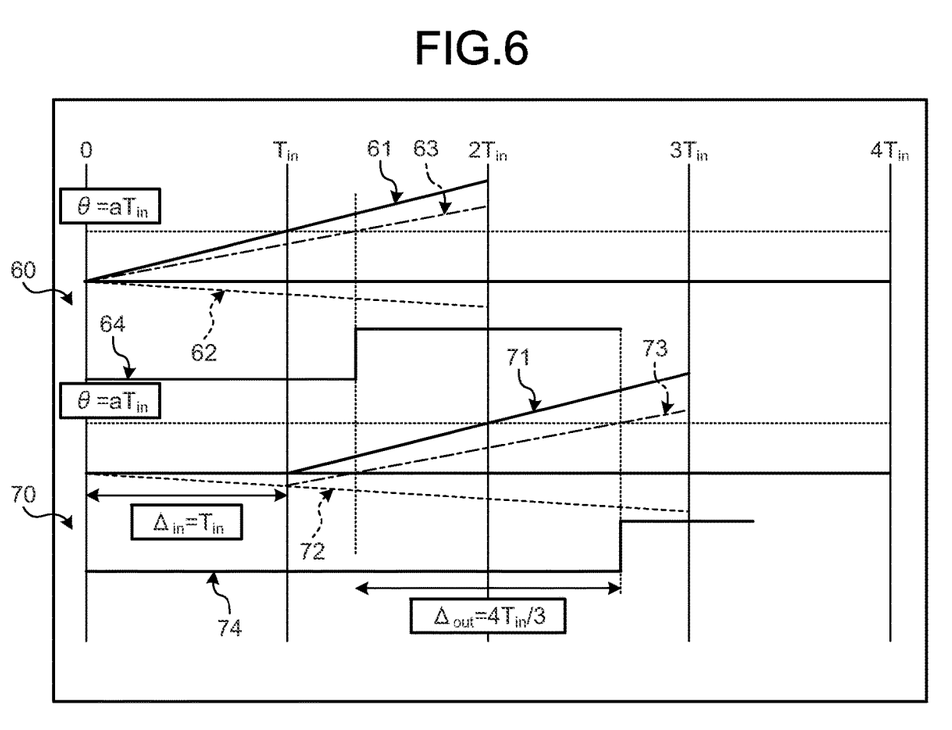
FIG. 6 is a diagram for explaining operations of the product-sum operator included in the product-sum arithmetic device according to the first embodiment of the present disclosure.

2-2. Example of Operations of Product-Sum Operator of Product-Sum Arithmetic Device According to First Embodiment The following is an explanation of operations of the product-sum arithmetic device according to the first embodiment of the present disclosure with reference to FIG. 6. FIG. 6 is a diagram for explaining operations of controlling timings of outputting a step signal from the comparison unit 18 with the product-sum operator 11A included in the product-sum arithmetic device according to the first embodiment of the present disclosure.

In FIG. 6, a graph 60 illustrates relation between the voltage stored in the storage unit 14 and the timing at which a step waveform is output from the comparison unit 18 in the case where the step waveform is output from the comparison unit 18 at the earliest timing. A graph 70 illustrates relation between the voltage stored in the storage unit 14 and the timing at which a step waveform is output from the comparison unit 18 in the case where the step waveform is output from the comparison unit 18 at the latest timing. In the graph 60 and the graph 70, the horizontal axis indicates the time, and the vertical axis indicates the voltage. In the graph 60 and the graph 70, suppose that the threshold θ is "$aT_{in}$", where the symbol "a" denotes any desired positive integer.

First, the following is an explanation of timing at which a step waveform is output from the comparison unit 18 in the case where no voltage is discharged from the storage unit 14.

A stored voltage 61 indicates temporal change of the voltage V stored in the storage unit 14 in the case where the step waveform is output from the comparison unit 18 at the earliest timing. Specifically, accumulation of charge in the storage unit 14 starts at the point in time of time 0. In addition, the voltage retained in the storage unit 14 temporally changes with the relation "V=at". The symbol "t" is a parameter of the time. In this case, the step waveform is output from the comparison unit 18 at the time when "t=Tin" is satisfied.

A stored voltage 71 indicates temporal change of the voltage V stored in the storage unit 14 in the case where the step waveform is output from the comparison unit 18 at the latest timing. Specifically, accumulation of charge in the storage unit 14 starts at the point in time of time "$\Delta_{in}=T_{in}$". In addition, the voltage retained in the storage unit 14 temporally changes with the relation "$V=a(t-T_{in})$" in the state in which "$t>T_{in}$" is satisfied. Specifically, the time interval Dout between the time when a step waveform is output from the comparison unit 18 at the earliest timing and the time when a step waveform is output from the comparison unit 18 at the latest timing is "$\Delta_{out}=2T_{in}-T_{in}=T_{in}$".

The following is an explanation of the timing at which a step waveform is output from the comparison unit 18 in the case where the voltage is discharged from the storage unit 14.

A discharged voltage 62 indicates temporal change of the voltage discharged from the storage unit 14 in the case where a step waveform is output from the comparison unit 18 at the earliest timing. Specifically, from the point in time of time 0, the voltage is discharged from the storage unit 14 with the current source 20 with the relation "V=−at/4". In this case, temporal change of the voltage stored in the storage unit 14 satisfies "V=at−at/4=3at/4", as illustrated with a stored voltage 63. In this manner, as illustrated with a step waveform 64, the waveform rises at the time when "$t=4T_{in}/3$" is satisfied, and a step waveform is output from the comparison unit 18.

A discharged voltage 72 indicates temporal change of the voltage discharged from the storage unit 14 in the case where a step waveform is output from the comparison unit 18 at the latest timing. Specifically, from the point in time of time 0, the voltage is discharged from the storage unit 14 with the current source 20 with the relation "V=−at/4". Specifically, a negative voltage is stored in the storage unit 14 from the time 0 to the time $T_{in}$. In this case, temporal change of the voltage stored in the storage unit 14 in the state in which "$t>T_{in}$" is satisfied satisfies "$V=a(t−T_{in})−at/4=3at/4−aT_{in}$", as illustrated with a stored voltage 73. In this manner, as illustrated with a step waveform 74, a step waveform is output from the comparison unit 18 at the time when "$t=8/3T_{in}$" is satisfied. Specifically, the time interval $\Delta_{out}$ between the time when a step waveform is output from the comparison unit 18 at the earliest timing and the time when a step waveform is output from the comparison unit 18 at the latest timing is "$\Delta_{out}=8T_{in}/3−4T_{in}/3=4T_{in}/3$".

As described above, discharging the voltage from the storage unit 14 extends the time interval between the time when a step waveform is output from the comparison unit 18 at the earliest timing and the time when a step waveform is output from the comparison unit 18 at the latest timing to 4/3 times. Specifically, the first embodiment of the present disclosure enables suppression of concentration of the timings at each of which a step waveform is output.

In addition, the first embodiment of the present disclosure enables further suppression of concentration of the timings at each of which a step waveform is output, by discharging the charge of the storage unit 14 in, for example, each of the layers forming the DNN 30 illustrated in FIG. 3.

In addition, the first embodiment according to the present disclosure sets the voltage discharged from the storage unit 14 as "V=−at/4", but this is an example and does not limit the present disclosure. The voltage discharged from the storage unit 14 may be set as desired according to the structure of the product-sum arithmetic device 10. In addition, for example, the first embodiment according to the present disclosure may have a structure of discharging the voltage from the storage unit 14 in accordance with a voltage value obtained by performing repeated learning.

2-3. Modification of First Embodiment

Figure 7:
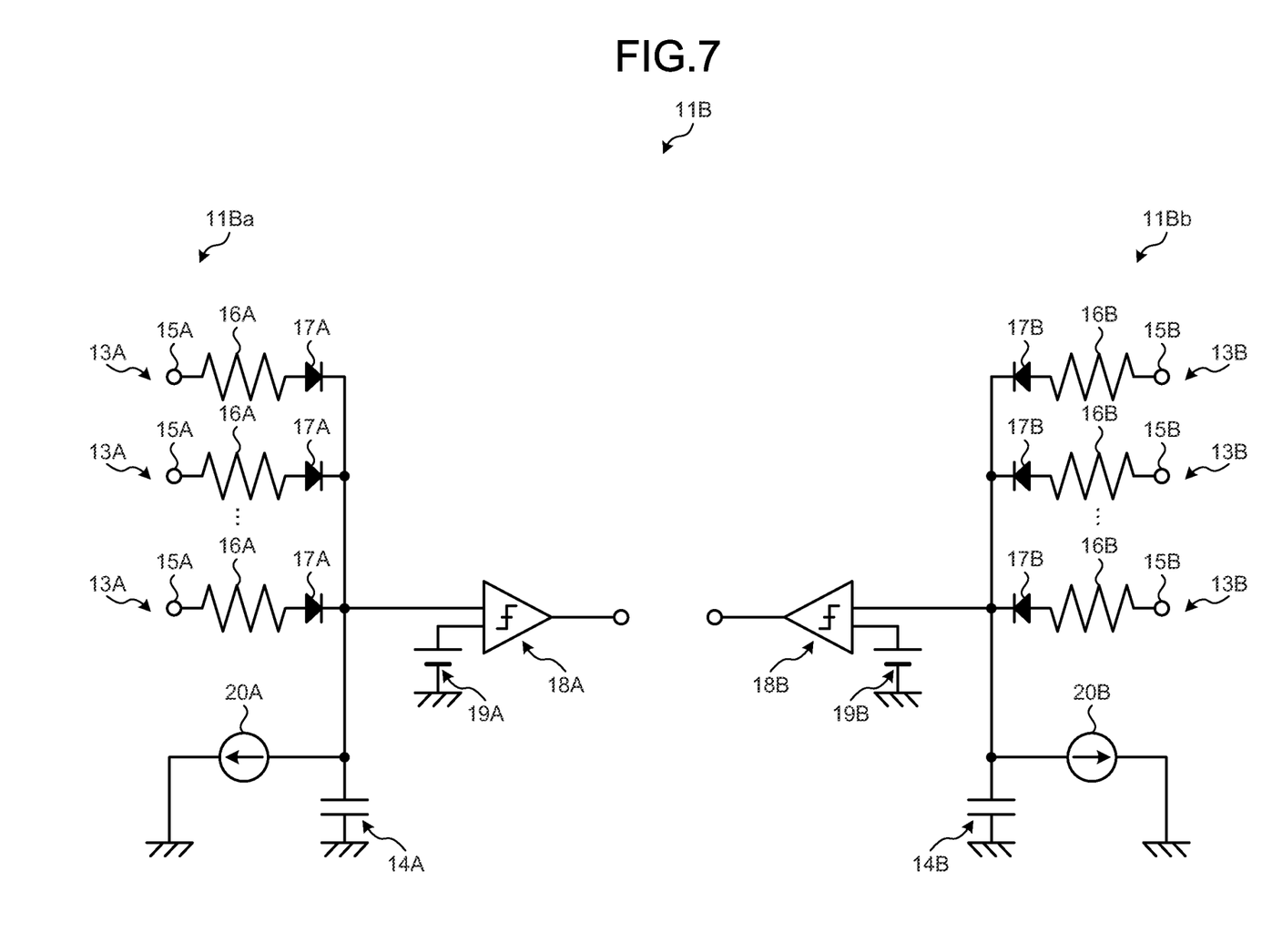
FIG. 7 is a diagram illustrating a modification of the product-sum operator included in the product-sum arithmetic device according to the first embodiment of the present disclosure.

The first embodiment according to the present disclosure may also be applied to, for example, a product-sum operator simulating a neural network determining the calculation target region by discrimination according to the positive weight $w_i^+$ and the negative weight $w_i^-$. In this case, for example, the structure is achieved by discharging the voltage of the same quantity in each of a comparison unit on the positive side and a comparison unit of the negative side.

FIG. 7 is a diagram illustrating an example of a product-sum operator 11B determining the calculation target region by discrimination with the positive weight $w_i^+$ and the negative weight $w_i^-$. As illustrated in FIG. 7, the product-sum operator 11B includes a product-sum operator 11Ba corresponding to the positive weight $w_i^+$ and a product-sum operator 11Bb corresponding to the negative weight $w_i^+$.

The product-sum operator 11Ba includes N output units 13A, a storage unit 14A, a comparison unit 18A, a threshold power source 19A, and a current source 20A. Each of the output units 13A includes an input terminal 15A, a resistor 16A, and a diode 17A. In this case, a positive weight $w_i^+$ is associated with each resistor 16A. The threshold power source 19A supplies first threshold voltage to the comparison unit 18A.

The product-sum operator 11Bb includes N output units 13B, a storage unit 14B, a comparison unit 18B, a threshold power source 19B, and a current source 20B. Each of the output units 13B includes an input terminal 15B, a resistor 16B, and a diode 17B. In this case, a positive weight $w_i^+$ is associated with each resistor 16B. The threshold power source 19B supplies second threshold voltage to the comparison unit 18B. The first threshold voltage and the second threshold voltage may be different from each other, or the same. When the first threshold voltage and the second threshold voltage are the same, the threshold power source 19A and the threshold power source 19B may be configured as a shared structure.

In the product-sum operator 11B, to control the timing of the step waveform output from the comparison unit 18A of the product-sum operator 11Ba, the current source 20A discharges the charge stored in the storage unit 14A. In addition, to control the timing of the step waveform output from the comparison unit 18B of the product-sum operator 11Bb, the current source 20B discharges the charge stored in the storage unit 14B. In this state, the inclination of the temporal change of the voltage of the storage unit 14A caused by discharge with the current source 20A is the same as the inclination of the temporal change of the voltage of the storage unit 14B caused by discharge with the current source 20B. This structure enables the product-sum operator 11B to suppress concentration of the timings at each of which a step waveform is output from the comparison unit 18A, and suppress concentration of the timings at each of which a step waveform is output from the comparison unit 18B.

3. Second Embodiment

Figure 8:
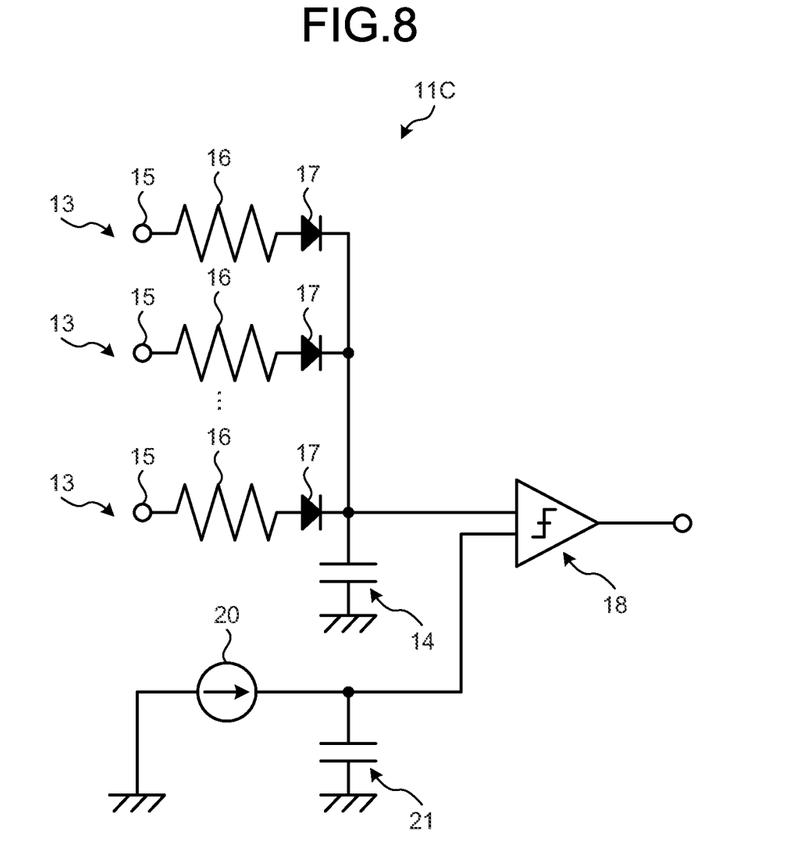
FIG. 8 is a diagram illustrating an example of a product-sum operator included in a product-sum arithmetic device according to a second embodiment of the present disclosure.

3-1. Structure of Product-Sum Operator of Product-Sum Arithmetic Device According to Second Embodiment The following is an explanation of a structure of a product-sum arithmetic device according to a second embodiment of the present disclosure with reference to FIG. 8. FIG. 8 is a diagram illustrating a structure of a product-sum operator included in the product-sum arithmetic device according to the first embodiment of the present disclosure.

As illustrated in FIG. 8, a product-sum operator 11C includes N output units 13, a storage unit 14, a comparison unit 18, a current source 20, and a threshold voltage storage unit 21. The product-sum operator 11C is different from the product-sum operator 11a in that the product-sum operator 11C includes the current source 20 and the threshold voltage storage unit 21.

In the product-sum operator 11C, the switch of the current source 20 is turned on and a current flows. In this manner, the voltage stored in the threshold voltage storage unit 21 is supplied as the threshold voltage to the comparison unit 18. Specifically, the current source 20 and the threshold voltage storage unit 21 function as a timing extension unit varying the threshold voltage of the comparison unit 18 with a lapse of time. For this reason, in the product-sum operator 11C, the threshold voltage of the comparison unit 18 is enabled to increase in comparison with the case where the threshold is a fixed value. This structure delays the time required until the voltage retained in the storage unit 14 reaches the threshold. As a result, this structure extends the time interval between the time when a step waveform is output from the comparison unit 18 and the time when a step waveform is output from the comparison unit 18 next.

The current source 20 may receive, for example, information relating to temporal change of the charge stored in the storage unit 14. In this case, the current source 20 may acquire information relating to temporal change of the charge stored in the storage unit 14 and measured with a charge quantity measuring device, such as a Coulomb meter and a charge amplifier, from the charge quantity measuring device. This structure enables the current source 20 to vary the threshold voltage in accordance with temporal change of the charge stored in the storage unit 14. Consequently, this structure more properly extends the time interval between the time when the step waveform is output from the comparison unit 18 and the time when a next step waveform is output from the comparison unit 18.

As described above, the second embodiment of the present disclosure enables extension of the time from the time when a step waveform is output from the comparison unit 18 to the time when a step waveform is output from the comparison unit 18 next, by temporally changing the threshold. With this structure, the second embodiment of the present disclosure enables suppression of concentration of the timings at each of which a step waveform is output from the comparison unit 18.

4. Third Embodiment

Figure 9:
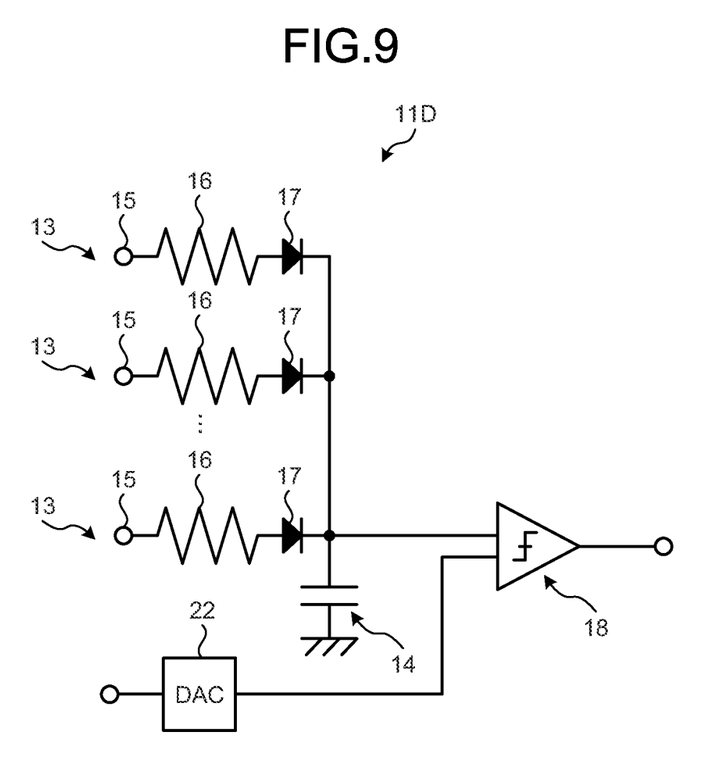
FIG. 9 is a diagram illustrating an example of a product-sum operator included in a product-sum arithmetic device according to a third embodiment of the present disclosure.

4-1. Structure of Product-Sum Operator of Product-Sum Arithmetic Device According to Third Embodiment The following is an explanation of a structure of a product-sum arithmetic device according to a third embodiment of the present disclosure with reference to FIG. 9. FIG. 9 is a diagram illustrating a structure of a product-sum operator included in the product-sum arithmetic device according to the first embodiment of the present disclosure.

As illustrated in FIG. 9, a product-sum operator 11D includes N output units 13, a storage unit 14, a comparison unit 18, a current source 20, and a digital to analog converter (DAC) 22. The product-sum operator 11D is different from the product-sum operator 11a in that the product-sum operator 11D includes the DAC 22.

The DAC 22 is connected with the comparison unit 18, converts an input digital signal to an analog signal, and supplies the analog signal as the threshold voltage to the comparison unit 18. Specifically, the DAC 22 functions as a timing extension unit varying the threshold voltage of the comparison unit 18 with a lapse of time. For this reason, the product-sum operator 11D enables the threshold voltage of the comparison unit 18 to increase in comparison with the case where the threshold is a fixed value. This structure delays the time required until the voltage retained in the storage unit 14 reaches the threshold. As a result, this structure enables more proper extension of the time interval between the time when a step waveform is output from the comparison unit 18 and the time when a step waveform is output from the comparison unit 18 next.

The DAC 22 is capable of varying the threshold voltage in accordance with temporal change of the charge stored in the storage unit 14, in the same manner as the second embodiment of the present disclosure. As a result, this structure enables more proper extension of the time interval between the time when a step waveform is output from the comparison unit 18 and the time when a step waveform is output from the comparison unit 18 next.

As described above, the third embodiment according to the present disclosure enables extension of the time from the time when a step waveform is output from the comparison unit 18 to the time when a step waveform is output from the comparison unit 18 next. With this structure, the second embodiment of the present disclosure enables suppression of concentration of timings at each of which a step waveform is output from the comparison unit 18.

The second embodiment and the third embodiment have been explained above as a method for varying the threshold voltage supplied to the comparison unit 18, but this is an example and does not limit the present disclosure. The method may be a method other than the second embodiment and the third embodiment, as long as it is a method for varying the threshold voltage to be supplied to the comparison unit 18.

Embodiments of the present disclosure have been explained above, but the technical range of the present disclosure is not limited to each of the embodiments described above without any change, but various change is possible within a range not departing from the gist of the present disclosure. In addition, constituent elements of different embodiments and modifications may be properly used in combination.

The effects described in the present specification are examples and not limited thereto, and other effects may exist.

The present technique may adopt the following structures.

(1)
A product-sum arithmetic device comprising:
a comparison unit comparing voltage generated with charge stored in a first storage unit with a threshold, and outputting an output signal at a timing when the voltage exceeds the threshold; and
a timing extension unit extending an interval between timings at each of which the output signal is output.

(2)
The product-sum arithmetic device according to (1), wherein the timing extension unit decreases quantity of the charge stored in the first storage unit.

(3)
The product-sum arithmetic device according to (1) or (2), wherein the timing extension unit supplies the threshold changing with a lapse of time to the comparison unit.

(4)
The product-sum arithmetic device according to (3), wherein the timing extension unit supplies the threshold to the comparison unit, on the basis of time change of charge stored in the first storage unit.

(5)
The product-sum arithmetic device according to (2), wherein the timing extension unit is a current source connected with the first storage unit.

(6)
The product-sum arithmetic device according to (3) or (4), wherein the timing extension unit is formed of a second storage unit connected with the comparison unit, and a current source connected with the second storage unit.

(7)
The product-sum arithmetic device according to (3) or (4), wherein the timing extension unit is a DAC (digital to analog converter) connected with the comparison unit.

(8)
A product-sum arithmetic circuit comprising:
a comparator comparing voltage generated with charge stored in a storage unit with a threshold, and outputting an output signal at a timing when the voltage exceeds the threshold; and
a current source connected with the storage unit and discharging the charge stored in the storage unit.

(9)
A product-sum arithmetic circuit comprising:
a comparator comparing voltage generated with charge stored in a first storage unit with a threshold, and outputting an output signal at a timing when the voltage exceeds the threshold; and
a voltage generator connected with the comparator and supplying the threshold changing with a lapse of time to the comparator.

(10)
The product-sum arithmetic circuit according to (9), wherein the voltage generator is formed of a second storage unit connected with the comparator, and a current source connected with the second storage unit.

(11)
The product-sum arithmetic circuit according to (9), wherein the voltage generator is a DAC.

(12)
A product-sum arithmetic method comprising:
comparing voltage generated with charge stored in a storage unit with a threshold, and outputting an output signal at a timing when the voltage exceeds the threshold; and
extending an interval between timings at each of which the output signal is output.

REFERENCE SIGNS LIST

10 PRODUCT-SUM ARITHMETIC DEVICE
11, 11a, 11A, 11B, 11Ba, 11Bb, 11C, 11D PRODUCT-SUM OPERATOR
12 INPUT UNIT
13 OUTPUT UNIT
14 STORAGE UNIT
15 INPUT TERMINAL
16 RESISTOR
17 DIODE
18 COMPARISON UNIT
19 THRESHOLD POWER SOURCE
20 CURRENT SOURCE
21 THRESHOLD VOLTAGE STORAGE UNIT
22 DAC

The invention claimed is:

1. An arithmetic device, comprising:
   a comparison unit configured to:
      compare a voltage generated based on charge stored in a first storage unit with a threshold; and
      output an output signal at a timing based on the generated voltage exceeds the threshold; and
   a timing extension unit configured to:
      extend an interval between timings at each of which the output signal is output; and
      decrease a quantity of the charge stored in the first storage unit.

2. The arithmetic device according to claim 1, wherein the timing extension unit is further configured to supply the threshold changing with a lapse of time to the comparison unit.

3. The arithmetic device according to claim 2, wherein the timing extension unit includes a second storage unit which is connected with the comparison unit and a current source which is connected with the second storage unit.

4. The arithmetic device according to claim 2, wherein the timing extension unit is a DAC (digital to analog converter) connected with the comparison unit.

5. The arithmetic device according to claim 1, wherein the timing extension unit is further configured to supply the threshold to the comparison unit based on the charge stored in the first storage unit and time for which the charge is stored in the first storage unit.

6. The arithmetic device according to claim 1, wherein the timing extension unit is a current source connected with the first storage unit.

7. An arithmetic circuit, comprising:
   a comparator configured to:
      compare a voltage generated based on charge stored in a storage unit with a threshold; and
      output an output signal at a timing based on the voltage exceeds the threshold; and
   a current source connected with the storage unit, wherein the current source is configured to discharge the charge stored in the storage unit.

8. An arithmetic circuit, comprising:
   a comparator configured to:
      compare voltage generated based on charge stored in a first storage unit with a threshold; and
      output an output signal at a timing based on the voltage exceeds the threshold; and
   a voltage generator connected with the comparator, wherein the voltage generator is configured to supply the threshold changing with a lapse of time to the comparator, wherein the voltage generator comprises a second storage unit which is connected with the comparator and a current source which is connected with the second storage unit.

9. The arithmetic circuit according to claim 8, wherein the voltage generator is a DAC.

10. A method, comprising:
    comparing voltage generated based on charge stored in a storage unit with a threshold;
    outputting an output signal at a timing based on the generated voltage exceeds the threshold;
    extending an interval between timings at each of which the output signal is output; and
    decreasing quantity of the charge stored in the storage unit.

* * * * *